United States Patent
Knechtges et al.

(10) Patent No.: US 6,412,880 B1
(45) Date of Patent: Jul. 2, 2002

(54) COMBINED POWER SUPPLY AND ELECTRONIC CONTROL CIRCUIT FOR ABS

(75) Inventors: David R. Knechtges, Lorain County; James E. Francesangeli, Medina County, both of OH (US)

(73) Assignee: Honeywell Commercial Vehicle Systems Co., Elyria, OH (US)

( * ) Notice: Subject to any disclaimer, the term of this patent is extended or adjusted under 35 U.S.C. 154(b) by 0 days.

(21) Appl. No.: 09/538,359

(22) Filed: Mar. 29, 2000

(51) Int. Cl.[7] .............................................. B60T 13/66
(52) U.S. Cl. ..................... 303/20; 303/DIG. 9; 303/199
(58) Field of Search ....................... 303/20, 199, DIG. 9

(56) References Cited

U.S. PATENT DOCUMENTS

| | | | | |
|---|---|---|---|---|
| 3,792,742 A | * | 2/1974 | Mager ........................ | 180/65 F |
| 4,697,092 A | | 9/1987 | Roggendorf | |
| 5,085,489 A | | 2/1992 | Emig | |
| 5,189,602 A | * | 2/1993 | Callier et al. ................. | 363/28 |
| 5,255,962 A | * | 10/1993 | Neuhaus et al. ............. | 303/111 |
| 5,288,139 A | * | 2/1994 | Singleton et al. ............. | 303/15 |
| 5,309,155 A | * | 5/1994 | Hsien et al. .................. | 340/907 |
| 5,547,265 A | * | 8/1996 | Harris et al. ................... | 303/10 |
| 5,957,551 A | * | 9/1999 | Maron et al. ................ | 303/191 |
| 5,961,190 A | * | 10/1999 | Brandmeier et al. ......... | 303/152 |
| 6,030,054 A | * | 2/2000 | Doericht ....................... | 303/20 |
| 6,118,279 A | * | 9/2000 | Field et al. ................... | 324/529 |
| 6,124,810 A | * | 9/2000 | Segal et al. .................. | 340/441 |
| 6,125,974 A | * | 10/2000 | Nishizawa et al. .......... | 188/73.35 |
| 6,130,487 A | * | 10/2000 | Bertalan et al. ............. | 307/9.1 |
| 6,189,981 B1 | * | 2/2001 | Niedermeier ................. | 303/20 |
| 6,213,567 B1 | * | 4/2001 | Zittlau et al. ................. | 303/20 |
| 6,227,626 B1 | * | 5/2001 | Blattert ......................... | 303/20 |
| 6,296,325 B1 | * | 10/2001 | Corio et al. ............. | 244/110 A |

FOREIGN PATENT DOCUMENTS

| | | |
|---|---|---|
| EP | 0 467 122 A2 | 1/1992 |
| GB | 2312260 | * 10/1997 |

\* cited by examiner

*Primary Examiner*—Matthew C. Graham
*Assistant Examiner*—Melody M. Burch

(57) ABSTRACT

A combined power supply and electronic control circuit uses existing power supply wires to communicate ABS control signals between individual electronic control units, mounted at each wheel of a tractor and a trailer, and a central electronic control module. The central electronic control module communicates with the wheel mounted electronic control modules using low voltage hi-frequency AC carrier signals. Each wheel mounted electronic control unit is assigned a signature voltage and frequency, permitting simultaneous communications by all of the wheel mounted electronic control units with the central electronic control module.

6 Claims, 1 Drawing Sheet

COMBINED POWER SUPPLY AND ELECTRONIC CONTROL CIRCUIT FOR ABS

FIELD OF THE INVENTION

This invention relates in general to a combined power supply and control circuit for a heavy vehicle antilock brake system (ABS). More specifically, using line carrier communication technology, the present invention electronically communicates between local wheel mounted electronic control modules and a central electronic control unit through existing power lines.

BACKGROUND OF THE INVENTION

Electronic antilock braking systems (ABS) for heavy vehicles, such as tractor trailer rigs, are well known in the art. ABS was designed to help the driver maintain steering and avoid skidding during emergency braking. The goal of an ABS is to keep the wheels turning in an emergency stop. Friction between the tread of the tire and the road surface during braking is at its maximum just before the wheel locks up. It is therefore beneficial to keep the wheels rotating at a rate of about 80% of the free rolling velocity for the vehicle's speed. The distance the vehicle will skid with locked up wheels is much greater than if the wheels were kept rotating at a point just before they lock up.

ABS works by limiting the braking pressure to any wheel which starts to lock up. This allows maximum braking force to be applied without brake lockup which would cause skidding. If standard non-ABS brakes are applied too hard, the wheels lock or skid, and the driver loses the ability to steer. If steering is lost, the vehicle skids in a straight line. ABS allows the driver to continue steering during hard braking in an emergency stop, thereby allowing the driver to maintain control of the vehicle.

To prevent skidding with standard non-ABS brakes, drivers had to either pump the brakes or sense the lockup and release the brake entirely. If only one wheel lost traction and started to skid, the driver would have to reduce braking force on all wheels to prevent a skid. On the other hand, ABS equipped vehicles maintain optimum braking force on each individual wheel. Thus, the braking force applied to the wheels with good traction can be maximized even if other wheels lose traction. As long as the wheels keep their grip on the road, the driver is able to steer and brake each wheel to its maximum capacity.

Antilock brake systems generally use a central electronic control module (ECM) to monitor and control the braking system. Individual wheel speed sensors communicate with the central ECM to determine if one or more wheels are about to lock up during braking. The system can electronically sense that one or more wheels are rotating at a different speed than the others on the vehicle. If rapid wheel speed deceleration indicative of lockup is detected during braking, the ECM signals to limit or reduce the braking pressure on that wheel. It then causes the braking action, on the wheel spinning more slowly due to lost traction, to be momentarily reduced, and braking action to that wheel is pulsed so the ECM can try to determine how much traction is available and, in turn, how much braking action that wheel should be given. This prevents skidding and allows the driver to maintain steering control. In addition, the ABS tests itself every time the vehicle is started and every time the brakes are applied. The system evaluates its own signals, and if a defect is detected the system then turns off leaving normal braking unaffected.

Current ABS systems for heavy duty vehicles, such as certain tractor trailer combinations, usually consist of up to two ECMs with up to eight wheel speed sensors and five antilock modulators. All of the control wiring required for these sensors and modulators must be routed from each device back to the cental ECM. As a result, the ABS control wiring for a full sized tractor trailer rig requires installation of hundreds of feet of control wiring. Control wiring must be routed from each individual wheel back to the central ECM, and this wiring is susceptible to failure due to vibration, short circuit, corrosion, wear, or ground failure.

The connection between a tractor and a trailer normally includes a wiring harness with multi-pin electrical connection plug plus connections for the air brake command and air brake supply lines. Electrical communication signals between the tractor and the trailer must pass through the wiring harness. The number of wires present in the existing wiring harness is limited to the number of pins in the multi-pin plug, and each of the existing pins already has a dedicated purpose. The limited number of available pins on an existing wiring harness make it difficult to expand the number of communication signals which can be sent between the tractor and the trailer, without resorting to extra trailer wiring and extra trailer plugs. Connection plugs are also susceptible to failure due to wear, vibration, or corrosion.

The additional quantity of vehicle wiring and connection plugs makes the system more complex, because each time the trailer is hitched up the operator must connect and check additional plugs. The system is also less reliable, because hundreds of feet of extra wire and extra plugs between the tractor and trailer create numerous potential failure points which may fail due to short circuit, ground failure, wear, vibration, or corrosion.

As a result, there is a need for an ABS which permits control signals to be transmitted and received between a central ECM and the wheels of tractor and trailer, without resorting to extra tractor and trailer wiring and plugs. In view of the above, it is an object of the invention to reduce the wiring harness requirements for a tractor/trailer ABS system.

SUMMARY OF THE INVENTION

The present invention provides a combined power supply and electronic control circuit using existing power supply wires to communicate ABS control signals between individual electronic control units, mounted at each wheel of a tractor and a trailer, and a central electronic control module. The central electronic control module communicates with the wheel mounted electronic control modules using low voltage hi-frequency AC carrier signals. Each wheel mounted electronic control unit is assigned a signature voltage and frequency, permitting simultaneous communications by all of the wheel mounted electronic control units with the central electronic control module.

In a preferred embodiment, the combined power supply and electronic control circuit for an antilock braking control system for a wheeled vehicle includes a central electronic control module having a power terminal and a grounding terminal, a main power bus connected to the power terminal, a main grounding bus connected to the grounding terminal, and a plurality of wheel mounted electronic control units, each electronic control unit including a power terminal connected to the main power bus and grounding terminal connected to the main grounding bus.

In operation, the central electronic control module communicates with the wheel mounted electronic control units via the main power bus and the main grounding bus using the AC carrier signals that are transmitted over the base DC voltage supplied by the main power bus. Accordingly, the requirement for additional wiring and plugs to connect the ECUs to the ECM is avoided, thereby greatly enhancing the reliability of the system while reducing the expense and complexity of the system.

Other advantages and features of the invention will become apparent from the following detailed description of the preferred embodiments and the accompanying drawings

BRIEF DESCRIPTION OF THE DRAWINGS

The invention will now be described with reference to certain preferred embodiments thereof and the accompanying drawing identified as FIG. 1, which illustrates a schematic block diagram of an ABS system in accordance with the invention.

DETAILED DESCRIPTION OF THE PREFERRED EMBODIMENTS

Figure 1:
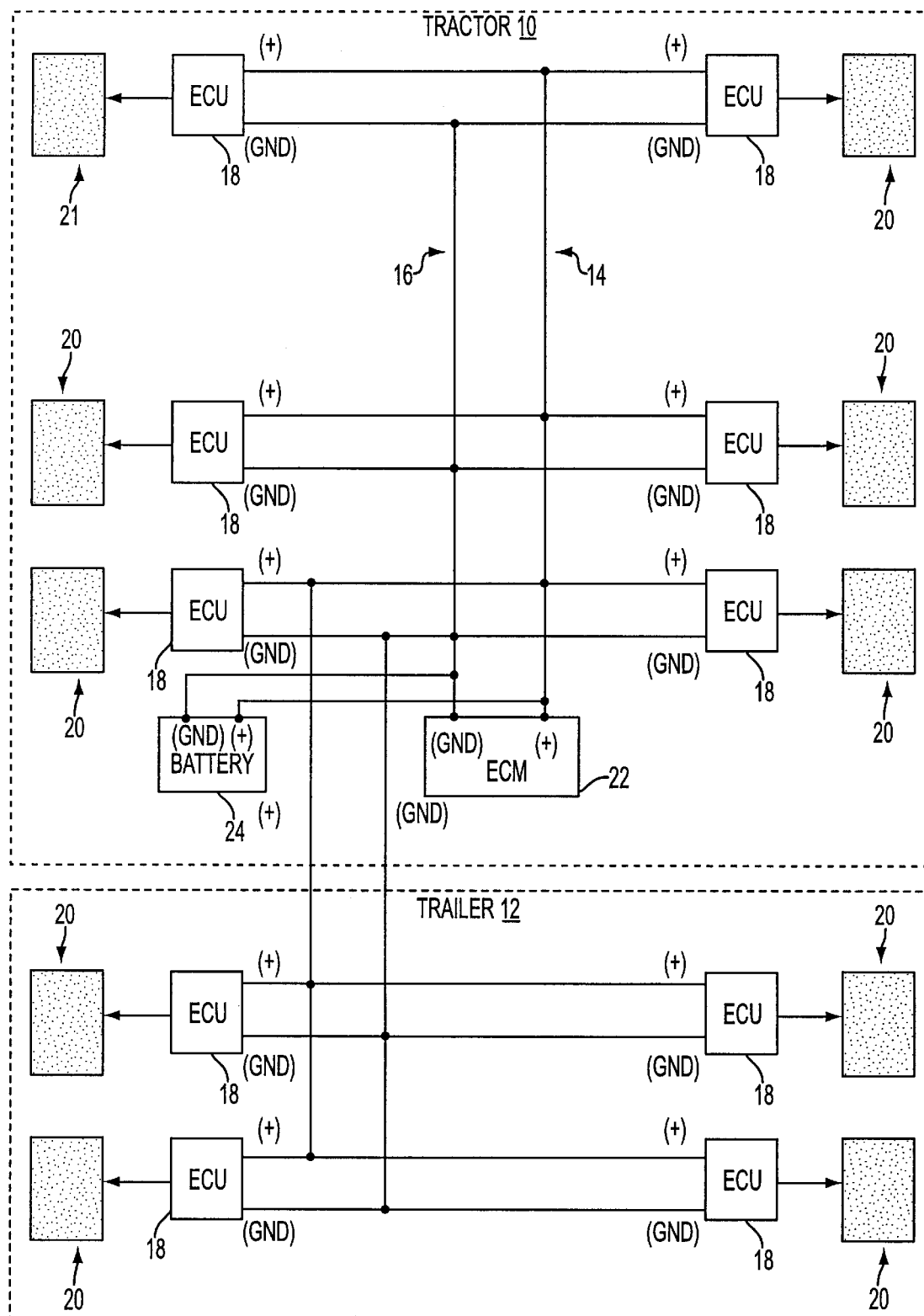

FIG. 1 illustrates an electrical wiring diagram of a preferred embodiment of the present invention showing the components of an ABS system. A tractor 10 is connected to a trailer 12 via a single power bus 14 and a single connecting ground bus 16. A local ECU 18 is located at each wheel 20 of the tractor 10 and trailer 12. Each ECU 18 includes a power terminal (+) connected to the power bus 14 and a grounding terminal (GND) connected to the ground bus 16. An central ECM 22 is installed at a location within the tractor 10. The ECM 22 is also coupled to the power bus 14 and the ground bus 16 by a power terminal (+) and a grounding terminal (GND). Power is supplied to the power bus 14 via the vehicle's electrical system which includes a storage battery 24.

The operation of the system will now be described. Each individual wheel mounted ECU 18 monitors wheel speed along with other necessary parameters as in a conventional ABS, and reports this information back to the central ECM 22. The central ECM 22 utilizes the information supplied to by the ECU's 18 to determine whether or not one or more wheels is locking up. If the central ECM 22 detects wheel lock up, then it dictates to the ECU's 22 what braking actions are to be performed using a conventional ABS modulator (not shown) to perform the ABS function.

The wheel mounted ECU's 18 and central ECM 22 utilize line carrier communications technology to transmit the necessary signals over the existing power bus structure consisting of the power supply bus 14 and the ground bus 16, namely, the power supply bus 14 and ground bus 16 are utilized to transmit control signals in addition to supplying a 12 VDC operating voltage to the various system components. The control signals are in the form of low voltage hi-frequency AC carrier signals that are transmitted simultaneously with the 12 VDC operating voltage. Due to their differing voltage and frequency the carrier signals do not interfere with the DC current. The common power bus structure is therefore utilized to supply both power and electronic data signals.

In order to distinguish signals received from different ECU's 18, each individual wheel 20 is assigned a signature voltage and frequency. The wheel mounted ECU's 18 will only transmit and respond to communications with a signature corresponding to their respective assigned wheel 20. In this manner, the central ECM 22 simultaneously monitors and controls the braking of all wheels 20 on one circuit.

The invention has been described with reference to certain preferred embodiments thereof. It will be understood, however, that modification and variations are possible within the scope of the appended claims. For example, the wheel mounted ECU's can monitor additional parameters and adjust braking force to prevent jack knifing or optimize vehicle stopping based upon individual wheel loading. Accordingly, any type of data and/or control signals may be communicated between the wheel mounted ECU's and the central ECM.

What is claimed is:

1. A combined power supply and electronic control circuit for an antilock braking control system for a wheeled vehicle comprising:

a central electronic control module having a power terminal and a grounding terminal;

a main power bus connected to the power terminal;

a main grounding bus connected to the grounding terminal; and a plurality of wheel mounted electronic control units, each electronic control unit including a power terminal connected to the main power bus and grounding terminal connected to the main grounding bus, wherein each wheel mounted electronic control unit is assigned a signature frequency that is different from signature frequencies assigned to every other wheel mounted electronic control unit;

wherein the central electronic control module communicates with each of the wheel mounted electronic control units via the main power bus and the main grounding bus at the signature frequency assigned to each such wheel mounted electronic control unit.

2. The combined power and electronic control circuit claimed in claim 1, wherein the central electronic control module communicates with the wheel mounted electronic control modules using low voltage hi-frequency AC carrier signals.

3. The combined power and electronic control circuit claimed in claim 2, wherein each wheel mounted electronic control unit is also assigned a signature voltage.

4. A vehicle braking control system comprising:

a central electronic control module;

a plurality of wheel mounted electronic control units, wherein each wheel mounted electronic control unit is assigned a signature frequency that is different from signature frequencies assigned to every other wheel mounted electronic control unit; and means for providing electronic data signals at each signature frequency, and power to the central electronic control module and the plurality of wheel mounted electronic control units utilizing a common bus structure.

5. The apparatus claimed in claim 4, wherein the central electronic control module communicates with the wheel mounted electronic control modules via the common bus structure using low voltage hi-frequency AC carrier signals.

6. The apparatus claimed in claim 5, wherein each wheel mounted electronic control unit is also assigned a signature voltage.

* * * * *